(12) United States Patent
Tetsuka et al.

(10) Patent No.: US 9,377,648 B2
(45) Date of Patent: Jun. 28, 2016

(54) LIQUID CRYSTAL DISPLAY DEVICE COMPRISING A WARM-UP CONFIGURATION AND A NORMAL CONFIGURATION, MOTORCYCLE INCLUDING SAME, AND METHOD OF USING SAME

(71) Applicant: HONDA MOTOR CO., LTD., Minato-Ku, Tokyo (JP)

(72) Inventors: Takashi Tetsuka, Wako (JP); Takeshi Kitajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 14/575,036

(22) Filed: Dec. 18, 2014

(65) Prior Publication Data

US 2015/0185545 A1 Jul. 2, 2015

(30) Foreign Application Priority Data

Dec. 27, 2013 (JP) ................. 2013-273259

(51) Int. Cl.
*G02F 1/1335* (2006.01)
*G02F 1/1333* (2006.01)
*G09G 3/36* (2006.01)
*G09G 3/34* (2006.01)
*B60K 37/02* (2006.01)
*B62K 11/04* (2006.01)
*B62J 99/00* (2009.01)

(52) U.S. Cl.
CPC .......... *G02F 1/133382* (2013.01); *B60K 37/02* (2013.01); *B62K 11/04* (2013.01); *G09G 3/3406* (2013.01); *G09G 3/36* (2013.01); *B60K 2350/106* (2013.01); *B62J 2099/0026* (2013.01); *G09G 2320/041* (2013.01); *G09G 2320/0646* (2013.01); *G09G 2330/026* (2013.01); *G09G 2380/10* (2013.01)

(58) Field of Classification Search
CPC .......... G02F 1/133382; G02F 1/13306; B60K 37/02; B60K 2350/106; B62K 11/04; G09G 2320/0646; B62J 2099/0026
USPC ........................................... 349/11
See application file for complete search history.

(56) References Cited

U.S. PATENT DOCUMENTS

2007/0164955 A1* 7/2007 Noguchi ............ G02B 27/0101
345/89
2008/0231789 A1* 9/2008 Kurasawa ........... G02F 1/13452
349/139

(Continued)

FOREIGN PATENT DOCUMENTS

JP 11-283759 A 10/1999
JP 2009-116036 A 5/2009

*Primary Examiner* — Paul Lee
(74) *Attorney, Agent, or Firm* — Carrier Blackman & Associates, P.C.; Joseph P. Carrier; William D. Blackman (57) ABSTRACT

A liquid crystal display device of a motorcycle is configured and arranged to rapidly warm up a liquid crystal panel at cool temperatures, without requiring an additional heating member. The liquid crystal display device includes a control unit, for controlling a liquid crystal panel, and a backlight. When the temperature of liquid crystal is lower than a predetermined value, or when it is within a fixed time period after turning on an ignition switch, as a warm-up period, the control unit increases power supplied to the backlight to a larger amount than that in a normal display state, to increase the amount of back light, and temporarily changes the entire display surface to a darker color, in order to increase the amount of light absorbed by the liquid crystal panel, simultaneously reducing the amount of light penetrating the display surface, and thereby speeding up warming of the liquid crystal panel.

20 Claims, 7 Drawing Sheets

(56) References Cited

U.S. PATENT DOCUMENTS

2010/0053494 A1* 3/2010 Li .................. G02F 1/133382
    349/60

2010/0060844 A1* 3/2010 Sawatari ........... G02F 1/133788
    349/187

* cited by examiner

LIQUID CRYSTAL DISPLAY DEVICE COMPRISING A WARM-UP CONFIGURATION AND A NORMAL CONFIGURATION, MOTORCYCLE INCLUDING SAME, AND METHOD OF USING SAME

CROSS-REFERENCE TO RELATED APPLICATIONS

The present invention claims priority under 35 USC 119 based on Japanese patent application No. 2013-273259, filed on Dec. 27, 2013. The entire priority document, including specification claims and drawings, is incorporated by reference herein.

BACKGROUND OF THE INVENTION

1. Technical Field of the Invention

The present invention relates to a liquid crystal display device including a liquid crystal panel and a backlight source, to a motorcycle including the liquid crystal display device, and to a method of operating the liquid crystal display device to expedite warmup thereof in cool temperatures.

2. Background Art

It is generally known that a display surface of a liquid crystal panel, which is its display screen, is less responsive at cool temperatures.

Hence, Japanese Patent Document Hei 11-283759 discloses a method of quickly increasing the temperature of a display surface at cool temperatures, in which a backlight source and a liquid crystal panel are actively heated with a heating element, while adjusting the amount of electric power supplied to the heating element included in a liquid crystal display device, to thereby stabilize the luminance characteristic of a display surface at cool temperatures.

However, in the liquid crystal display system described in Japanese Patent Document Hei 11-283759, not only is the liquid crystal display device provided with an additional heating element, but also a power supply device or the like is required for the heating element. This leads to problems of high cost of the liquid crystal display device, and a limitation on space inside the liquid crystal display device.

SUMMARY OF THE INVENTION

In view of these problems, it is an object of the present invention to provide a liquid crystal display device that can promote an increase in the temperature of a liquid crystal panel at cool temperatures without requiring an additional member.

It is another object of the present invention to provide a motorcycle incorporating the improved liquid crystal display device.

It is another object of the present invention to provide a method of rapidly warming up a liquid crystal display device at cool temperatures.

Reference numbers are included in the following description corresponding to the reference numbers used in the drawings. Such reference numbers are provided for illustration and are not intended to limit the invention.

A liquid crystal display device (28) according to an illustrative embodiment of the present invention includes a liquid crystal panel (78) and a backlight source (116) arranged on the rear side of a display surface (118) of the liquid crystal panel (78), and has the following characteristics.

First characteristic: the liquid crystal display device (28) further includes a display device control unit (114) for controlling a display state of the liquid crystal panel (78). The liquid crystal panel (78) has: a warm-up configuration for increasing the temperature of the liquid crystal panel (78) when the temperature of the liquid crystal panel (78) is lower than a predetermined value, or when it is within a predetermined time period after starting the liquid crystal panel (78); and a normal configuration for performing normal operation after completion of the warm-up period. The display device control unit (114) performs control to switch between the warm-up configuration and the normal configuration, and during the warm-up period, adjusts display contents on the display surface (118) such that an amount of light penetrating the liquid crystal panel (78) becomes smaller than that in the normal configuration, as well as increases output of the backlight source (116) to a larger amount than that in the normal configuration.

Second characteristic: the liquid crystal display device (28) including a housing (68) that accommodates the liquid crystal panel (78) and the backlight source (116), and having an opening (74) through which the display surface (118) is exposed to the outside. The display device control unit (114) adjusts an amount of electric power supplied to the backlight source (116), and the display device control unit (114) is arranged inside the housing (68).

According to the first characteristic of the present invention, an increase in the temperature of the liquid crystal panel can be promoted without requiring an additional member, by increasing output of the backlight source to increase the heating power, as well as changing the display state of the display surface of the liquid crystal panel to a display state where a smaller amount of light penetrates the display surface. Specifically, by changing the color of the display surface to a less transmissive color, and thereby allowing the liquid crystal panel to more easily absorb backlight from the backlight source, the liquid crystal panel can easily receive heat and the temperature of liquid crystal provided inside the liquid crystal panel can be increased efficiently.

According to the second characteristic of the present invention, arranging the liquid crystal panel, the backlight source, and the display device control unit inside the housing efficiently promotes an increase in the temperature of the liquid crystal panel, since not only the quantity of heat of backlight from the backlight source, but also the quantity of heat generated when the display device control unit adjusts the electric power amount of the backlight source is utilized effectively.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Hereinbelow, a detailed description will be given of a liquid crystal display device in relation with a straddle type vehicle to which the liquid crystal display device is applied, by using a preferred embodiment and referring to the accompanying drawings.

Figure 1:
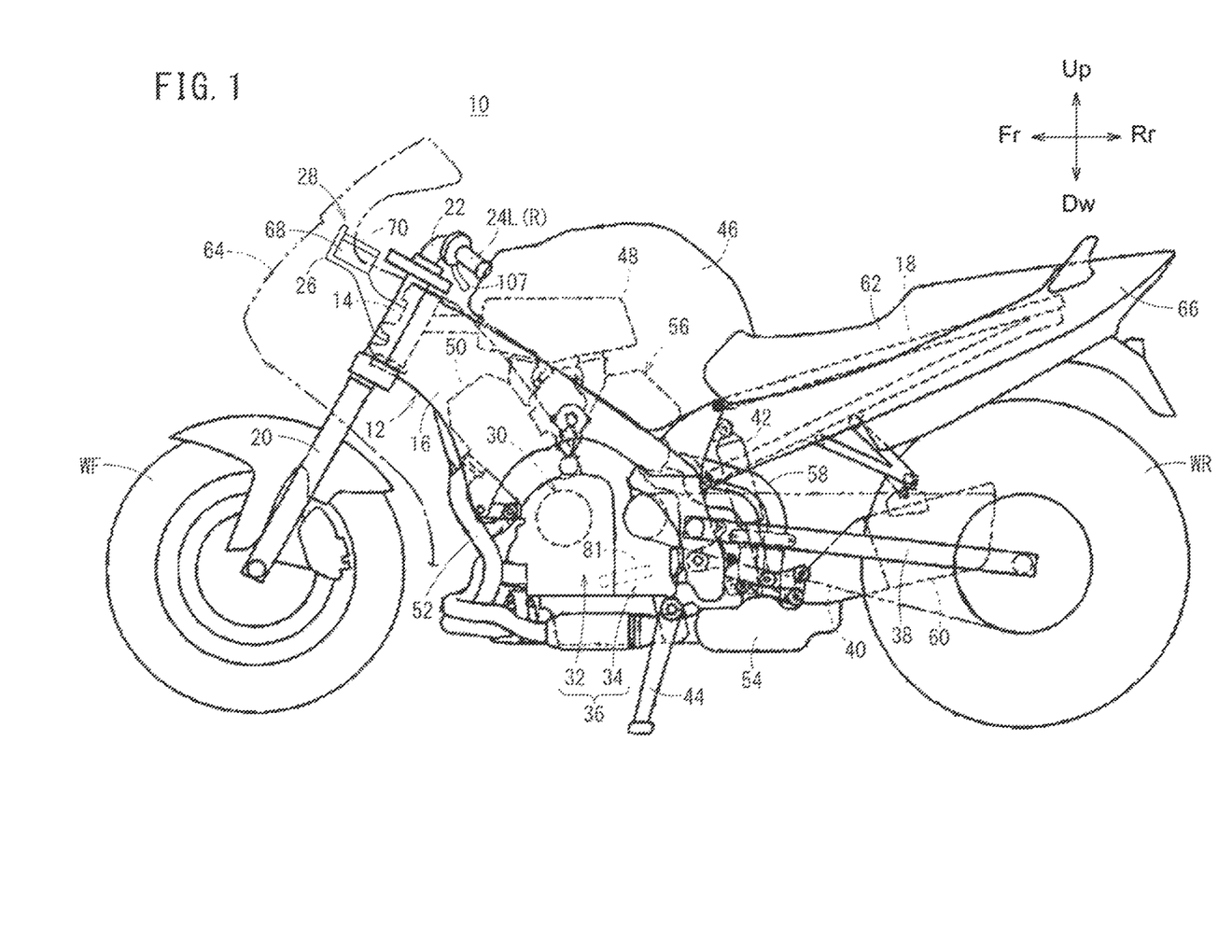
FIG. 1 is an external left side view of a motorcycle having a liquid crystal display device according to an illustrative embodiment of the present invention.

FIG. 1 is an external left side view of a motorcycle 10 as an example of a straddle type vehicle.

A body frame 12 of the motorcycle 10 includes a head pipe 14, a main frame 16 extending downward in the rear direction from the head pipe 14, and a seat frame 18 extending upward in the rear direction from around a rear portion of the main frame 16. The head pipe 14 pivotally and rotatably supports a front fork 20, which rotatably supports a front wheel WF as a steering wheel.

A handlebar 22 is attached to a top portion of the front fork 20, and handle grips 24L, 24R are provided on the left and right of the handlebar 22. The rider can steer the front wheel WF by gripping the left and right handle grips 24L, 24R and steering.

A liquid crystal display device 28 according to the embodiment as a meter unit is arranged in front of the handlebar 22 and above the head pipe 14 through a bracket 26.

A power unit 36 including a transmission 34 and a V4 engine 32 having its crankshaft 30 disposed in the vehicle width direction, which is the crosswise direction, is attached to a lower portion of the main frame 16. Power outputted from the crankshaft 30, which is the main shaft of the engine 32, is transmitted to a rear wheel WR as a driving wheel through the transmission 34.

A swing arm 38 pivotally and rotatably supporting the rear wheel WR is swingably supported by a rear lower portion of the main frame 16. A driving force of the engine 32 outputted through the transmission 34 is transmitted to the rear wheel WR as the driving wheel through a drive chain 40. The swing arm 38 is suspended from a rear upper portion of the main frame 16 by a rear cushion unit 42. A side stand 44 that supports the vehicle body when the vehicle is parked is attached to a rear bottom end portion of the main frame 16 on its left side.

A fuel tank 46 and an air cleaner box 48 are provided in upper portions of the main frame 16. Exhaust gas from a front cylinder 50 of the engine 32 is transmitted to an expansion chamber 54 through a front exhaust pipe 52. Exhaust gas from a rear cylinder 56 of the engine 32 is transmitted to the expansion chamber 54 through a rear exhaust pipe 58. The exhaust gas transmitted to the expansion chamber 54 is discharged to the rear of the vehicle through a muffler 60.

A seat 62 on which the rider sits is provided above the seat frame 18. A front cowl 64 covering the front of the vehicle is provided in front of the head pipe 14 and the liquid crystal display device 28, while a rear cowl 66 covering the sides and rear of the vehicle is provided in side and rear portions of the seat frame 18.

Figure 2:
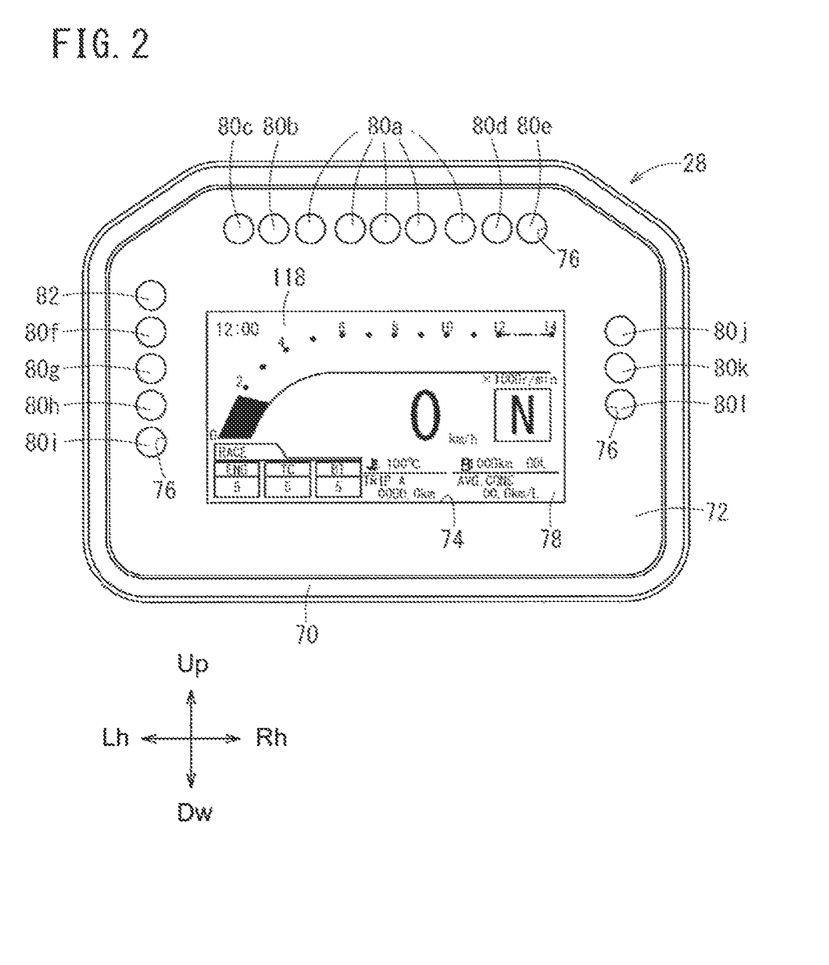
FIG. 2 is a front view of a liquid crystal display device of FIG. 1.

FIG. 2 is a front view of the liquid crystal display device 28 as seen from the vantage point of an operator sitting on the seat 62.

The liquid crystal display device 28 of the embodiment has a structure in which a bottomed cylindrical housing 68 mounted on the bracket 26 of FIG. 1 is covered with a cover member 70. A lens 72 whose rear face is colored in black, for example, is fitted to the inside of the cover member 70. A rectangular opening 74 is formed in a center portion of the lens 72, and multiple hole portions 76 are formed around the opening 74.

In this case, when the rider looks at the liquid crystal display device 28, a liquid crystal panel 78 is viewed through the opening 74, while multiple LEDs 80$a$ to 80$l$ and a photo sensor 82 are viewed through the respective hole portions 76.

Various information such as the vehicle speed of the motorcycle 10 is displayed on the liquid crystal panel 78.

Of the nine LEDs 80$a$ to 80$e$ on the upper side of the liquid crystal panel 78, the center five LEDs 80$a$ are shift up indicators that are lit at the same time to instruct the rider to press on a shift pedal 81 for shifting up the shift position. On the left, the LED 80$b$ is lit when traction control is on, and the LED 80$c$ is lit when traction control is off. Meanwhile, on the right, the LED 80$d$ is lit to warn that the temperature of cooling water is high, and the LED 80$e$ is lit for notification that authentication process requiring a key fob, which is a portable device of an electronic key system applied to the motorcycle 10, cannot be carried out since the rider does not carry the key fob.

Of the four LEDs 80$f$ to 80$i$ on the left side of the liquid crystal panel 78, the LED 80$f$ is lit when the motorcycle 10 is turning left. The LED 80$g$ is lit for notification that there is only a small amount of fuel left in the fuel tank 46. The LED 80$h$ is lit when the headlight is switched to high beam. The LED 80$i$ is lit for notification that the key fob is authenticated.

Of the three LEDs 80$j$ to 80$l$ on the right side of the liquid crystal panel 78, the LED 80$j$ is lit when the motorcycle 10 is turning right. The LED 80$k$ is lit when an electronically controlled steering damper is in operation. The LED 80$l$ is lit when the shift position is neutral.

The photo sensor 82 is a sensor for detecting light around the liquid crystal display device 28 such as sunlight.

Figure 3:
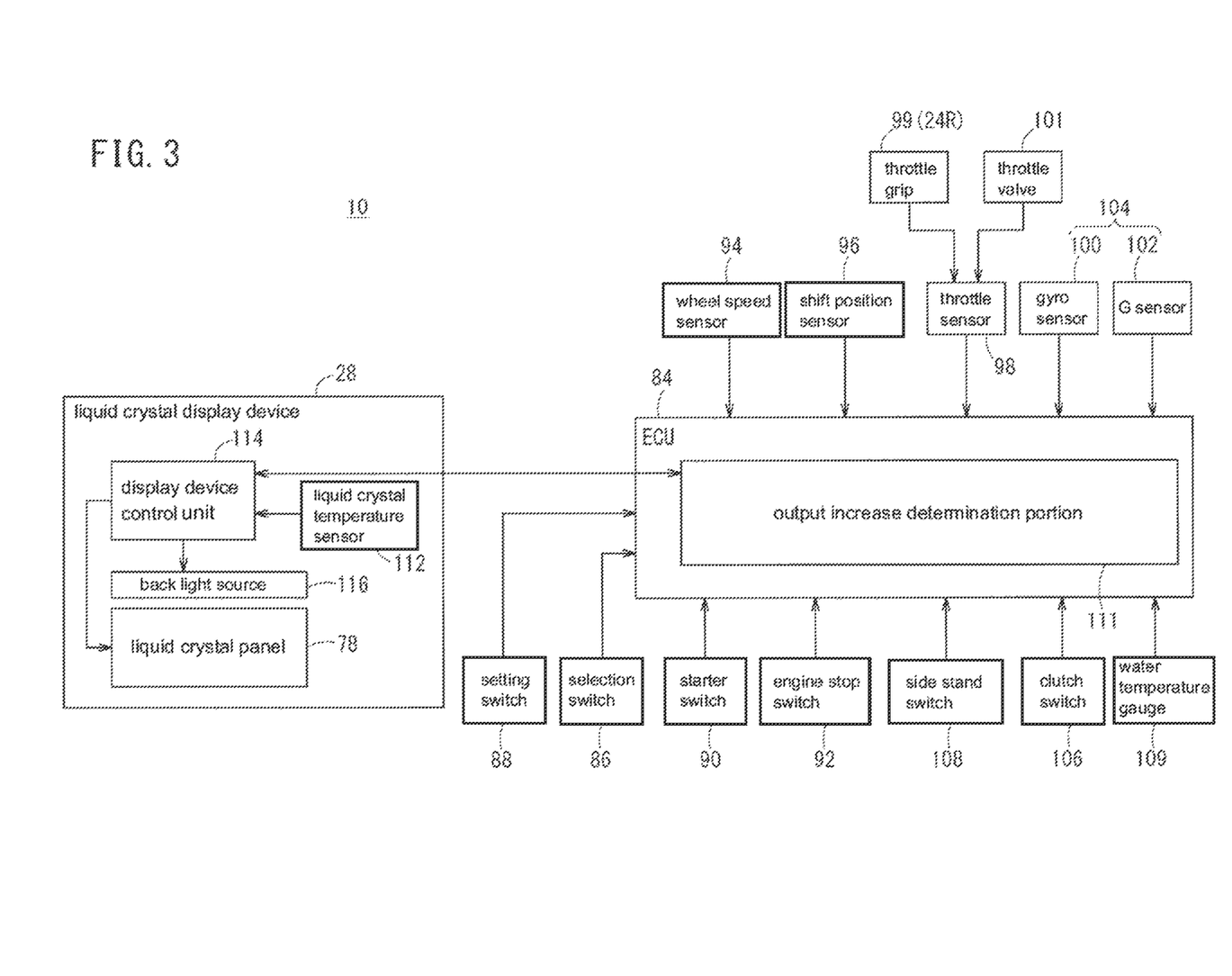
FIG. 3 is a block diagram of the motorcycle of FIG. 1.

FIG. 3 is a block diagram of the motorcycle 10 related to display control of the liquid crystal panel 78.

The motorcycle 10 further includes an ECU 84 for controlling the power unit 36 and the like. Various switches and sensors are provided in the motorcycle 10, and output signals from the switches and detection signals from the sensors are inputted to the ECU 84.

To be specific, the motorcycle 10 is provided with: a selection switch 86, a setting switch 88, a starter switch 90; an engine stop switch 92, a wheel speed sensor 94, a shift position sensor 96, a throttle sensor 98, an acceleration sensor 104 including a gyro sensor 100 and a G sensor 102 and used for theft prevention or slip ratio control of the motorcycle 10, a clutch switch 106, a side stand switch 108, and a water temperature gauge 109. Note that slip ratio control refers to ABS (anti-lock braking system), TCS (traction control system), and the like.

The selection switch 86 and the setting switch 88 are provided separately from the liquid crystal display device 28. In this case, the selection switch 86 can switch display contents of the liquid crystal panel 78 according to the rider's operation, and outputs a switch request signal instructing switching of the display contents to the ECU 84. According to the rider's operation, the setting switch 88 sets the display content of the liquid crystal display device 78 switched by the selection switch 86, and outputs a setting request signal instructing setting of the display content to the ECU 84.

The starter switch 90 starts the engine 32 according to the rider's operation when an unillustrated ignition switch is on and the shift position is neutral, and outputs a start instruction signal instructing start of the engine 32 to the ECU 84. Note that when the ignition switch is turned on, electric power supply to the liquid crystal display device 28, the ECU 84, and the like from an unillustrated battery is started, so that the liquid crystal display device 28 and the ECU 84 can be started.

The engine stop switch 92 stops the engine 32 according to the rider's operation, and outputs a stop instruction signal instructing stop of the engine 32 to the ECU 84.

The wheel speed sensor 94 detects the vehicle speed of the motorcycle 10 and outputs it to the ECU 84.

The shift position sensor 96 detects a shift position to which the rider shifts up or shifts down by operating the shift pedal 81, and outputs it to the ECU 84. Note that a hand-operated shift switch or the like may be provided instead of the shift pedal 81, and a shift position to which the rider operates the shift switch may be detected.

The throttle sensor 98 is either a grip position sensor detecting the rider's operation amount of the right handle grip 24R as a throttle grip 99, or a throttle position sensor detecting an actual opening of a throttle valve 101 based on the operation amount. Hence, the throttle sensor 98 outputs a detection signal depending on the detected operation amount or actual opening to the ECU 84.

The gyro sensor 100 is a three-dimensional acceleration sensor detecting angular acceleration, which is rotational acceleration in the roll axis direction, the pitch axis direction, and the yaw axis direction of the motorcycle 10, and outputting it to the ECU 84. Specifically, the gyro sensor 100 detects a posture change of the motorcycle 10 around its longitudinal axis as rotational acceleration in the roll axis direction, a posture change around the vehicle width axis as rotational acceleration in the pitch axis direction, and rotational movement around the vertical axis as rotational acceleration in the yaw axis direction.

The G sensor 102 is a three-axis acceleration sensor detecting acceleration in the longitudinal direction, the width direction, which is the crosswise direction, and the vertical direction, and outputting it to the ECU 84.

Accordingly, the acceleration sensor 104 configured of the gyro sensor 100 and the G sensor 102 is a six-axis compound sensor detecting acceleration of the motorcycle 10 in roll, yaw, pitch, straight, which is translational, width, and vertical directions, and outputting it to the ECU 84.

When the rider operates a clutch lever 107 provided in the vicinity of the left handle grip 24L and the clutch lever 107 swings for a predetermined angle, the clutch switch 106 determines that the rider has disengaged the clutch and outputs a detection signal to the ECU 84.

When the side stand 44 is held up in a predetermined storing position, the side stand switch 108 outputs a detection signal to the ECU 84.

The water temperature gauge 109 detects the water temperature of cooling water of the engine 32, and outputs it to the ECU 84.

Note that in the embodiment, operation results of the rider's operation of controls for a front brake switch and a rear brake switch, respectively, may be inputted to the ECU 84.

Alternatively, a detection signal from each sensor, which detects an operation result of the rider's operation of a brake lever or a brake pedal as a controller, may be inputted to the ECU 84. In this case, a stop lamp switch outputs an output signal indicating lighting of a stop lamp to the ECU 84, when lighting the stop lamp in response to the rider's operation of the brake lever or the brake pedal.

In addition, in the embodiment, operation results of the rider's operation of controllers such as a turn signal switch and a dimmer switch may be inputted to the ECU 84. In this case, the turn signal switch outputs the rider's operation result to the ECU 84 when the rider operates the turn signal switch to light a turn signal lamp. Meanwhile, the dimmer switch outputs the rider's operation result to the ECU 84 when the rider operates the dimmer switch to switch the headlight to high beam or low beam.

Incidentally, the display surface 118 of the liquid crystal panel 78 is less responsive at cool temperatures. For this reason, an increase in the temperature of the display surface 118 is needed at low temperatures to enhance its responsiveness. The present invention provides a method of expediting warmup of the display surface at low temperatures.

Accordingly, the ECU 84 of the embodiment is provided with an output increase determination portion 111. The output increase determination portion 111 includes a timer which starts counting from a time when the rider turns on the ignition switch, and continues to output increase signals for increasing the temperature of the liquid crystal panel 78 to the liquid crystal display device 28 during a warm-up period of the liquid crystal panel 78, until a fixed time period passes.

Specifically, within a fixed time period after turning on the ignition switch, the temperature of liquid crystal of the liquid crystal panel 78 is considered to be low, and thus the output increase determination portion 111 generates an output increase signals to the liquid crystal display device 28, in order to increase the temperature of liquid crystal in the panel. Hence, the output increase determination portion 111 continues to transmit the output increase signals to the liquid crystal display device 28, while regarding the period until the timer counts up the fixed time period as the warm-up period.

Note that since electric power supply to the liquid crystal display device 28 starts when the ignition switch is turned on, as mentioned earlier, the fixed time period after a time when the ignition switch is turned on refers to a predetermined time period after starting the liquid crystal display device 28 including the liquid crystal panel 78.

Additionally, detection signals according to the water temperature of cooling water detected by the water temperature gauge 109 are inputted to the ECU 84. Hence, if the water temperature of cooling water is lower than a predetermined temperature, the output increase determination portion 111 may determine that the temperature of liquid crystal inside the liquid crystal panel 78 mounted on the motorcycle 10 is also low, and send the output increase signal to the liquid crystal display device 28 to increase the temperature of liquid crystal. In this case, the water temperature gauge 109 detects the water temperature of cooling water at predetermined time intervals or continuously.

Accordingly, the output increase determination portion 111 continues to send the output increase signals to the liquid crystal display device 28 during a period until the water temperature of cooling water increases up to a water temperature corresponding to the temperature of liquid crystal, as the warm-up period of the liquid crystal panel 78.

Note that since the ECU 84 receives input of the operation results of the switches and the detection signals from the sensors in the embodiment as mentioned before, it may control not only the liquid crystal display device 28, but also other parts of the motorcycle 10 according to the inputted operation results and detection signals, as a matter of course. For example, when the ECU 84 receives input of a start instruction signal from the starter switch 90, it starts the engine 32. When the ECU 84 receives input of a stop instruction signal from the engine stop switch 92, it stops the engine 32.

In addition to the liquid crystal panel 78, the liquid crystal display device 28 also has a liquid crystal temperature sensor 112, display device control unit 114, and a backlight source 116. The liquid crystal panel 78, the liquid crystal temperature sensor 112, the display device control unit 114, and the backlight source 116 are accommodated inside the housing 68.

The liquid crystal temperature sensor 112 detects the temperature of the liquid crystal panel 78, and more specifically, the temperature of liquid crystal inside the liquid crystal panel 78, and outputs it to the display device control unit 114.

The display device control unit 114 controls the liquid crystal panel 78 and the backlight source 116. Note that "the output increase determination portion 111 of the ECU 84 sends the output increase signal to the liquid crystal display device 28," mentioned earlier, more specifically means that the output increase determination portion 111 of the ECU 84 sends the output increase signal to the display device control unit 114 inside the liquid crystal display device 28. The display device control unit 114 controls output of the liquid crystal panel 78 and the backlight source 116 on the basis of the received output increase signals.

To be more precise, the backlight source 116 is arranged on the rear side of a display surface 118 of the liquid crystal panel 78, and irradiates the liquid crystal panel 78 with backlight to display the contents of the display surface 118 with a desired brightness. In this case, the display device control unit 114 adjusts the light amount of backlight outputted from the backlight source 116 by adjusting the amount of electric power supplied to the backlight source 116, and can thereby vary the luminance of the display surface 118.

Figure 4A:
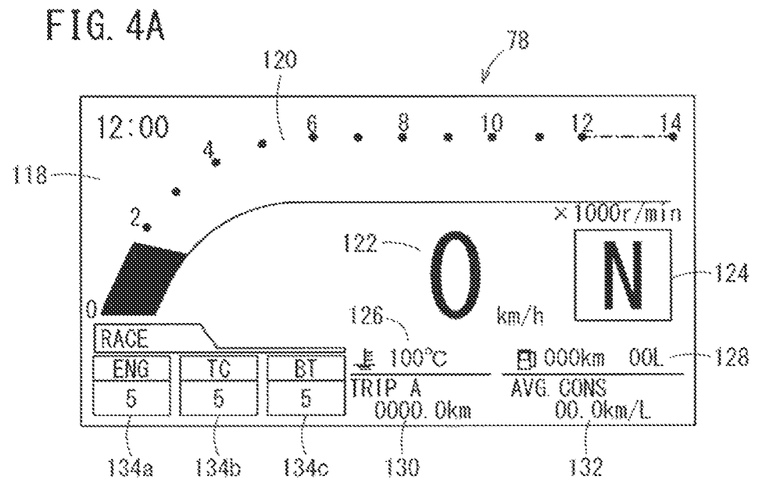
FIG. 4A is an explanatory view showing display contents of a display surface of a liquid crystal panel during a normal configuration after the panel reaches operating temperature.

Accordingly, to set the brightness of the liquid crystal display device 28 to the normal display state, which is a normal luminance, the display device control unit 114 causes the backlight source 116 to irradiate the liquid crystal panel 78 with backlight of a first desired light amount which is a normal operating luminance, and displays the display contents of the display surface 118 in colors having low optical transmittance, such as red, blue, and black, while displaying the background portion in a color having high optical transmittance, such as white, as shown in FIG. 4A, for example. Note that in the following description, a configuration when the display surface 118 is displayed in the normal display state is also called a normal configuration.

Meanwhile, if the temperature of liquid crystal detected by the liquid crystal temperature sensor 112 is lower than a predetermined set value, or if the output increase signal is inputted from the output increase determination portion 111, i.e., if the temperature of liquid crystal is cool, the display device control unit 114 increases output of the backlight source 116 to a larger amount than that in the normal display state, which may also be referred to as an enhanced luminance, to increase the light amount of backlight irradiated on the liquid crystal panel 78.

Figure 4B:
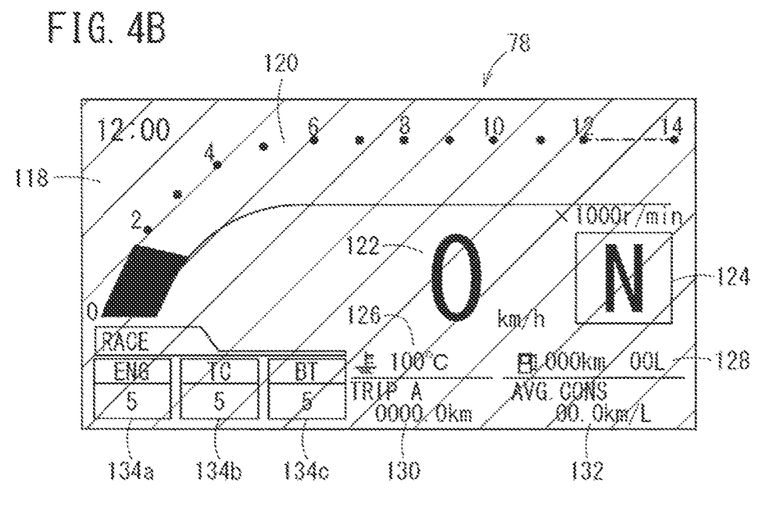
FIG. 4B is an explanatory view showing display contents of the display surface of the liquid crystal panel during a warm-up configuration.

Further in this low-temperature condition, the display device control unit 114 also changes the display color of the background portion of the display surface 118 to a color such as gray, having low optical transmittance, that is more likely to absorb backlight, and that is also less likely to transmit backlight, as shown in FIG. 4B.

In other words, during the above-mentioned warm-up period, the entire display surface 118 is switched to a display state in a darker color from the normal display state. Since this darker color is more likely to absorb backlight, this tends to make the liquid crystal panel 78 warm up more quickly than it would with the display surface 118 in a light color.

Note that optical transmittance of the display contents may also be lowered when lowering optical transmittance of the background portion.

FIG. 4A shows the normal display state of the display surface 118 in the normal configuration, and FIG. 4B shows the darkened display state of the display surface 118 in the warm-up configuration. Note that the display contents of the display surface 118 are displayed in black as an example in FIGS. 4A and 4B.

In FIG. 4A, a revolution indicator 120 indicating the engine revolutions of the motorcycle 10, a vehicle speed indicator 122 indicating the vehicle speed, a shift position indicator 124 indicating the shift position, a water temperature indicator 126 indicating the temperature of cooling water, a fuel indicator 128 indicating the remaining amount of fuel in the fuel tank 46 and the distance that the vehicle is capable of traveling, a travel distance indicator 130 indicating the travel distance, and a fuel consumption indicator 132 indicating the average fuel consumption are displayed on the display surface 118.

Additionally, output response indicators 134a to 134c indicating degrees of output responses of parts of the motorcycle 10 are also displayed on the display surface 118.

To be specific, one of integers 1 to 10 is displayed as the degree of output response on each of the output response indicators 134a to 134c. In this case, a larger number indicates a larger output response to the rider's operation amount of the controller of the motorcycle 10. The numerical value displayed on each of the output response indicators 134a to 134c is adjustable by the rider's operation of an unillustrated operation button.

The output response indicator 134a indicates the degree of response of engine output to the rider's operation amount of the throttle grip 99, and a larger value indicates that engine output is more responsive to changes in the operation amount. In addition, the output response indicator 134b indicates the effectiveness of traction control, and a larger value indicates that traction control is performed even at a relatively lower slip ratio. Moreover, the output response indicator 134c indicates the effectiveness of back torque, and a larger value indicates that a larger engine brake is actuated.

Meanwhile, in the display state in the warm-up configuration in FIG. 4B, the display color of the background portion of the display contents of the display surface 118 is changed to a darker color having low optical transmittance, such as gray, such that the entire display surface 118 is dimmed. In FIG. 4B, the background portion displayed in the darker color is indicated by diagonal lines.

Note that even when the display surface 118 is once displayed as in FIG. 4B, if the temperature of liquid crystal attains the set threshold value, or the inputting of output increase signals stops, the warm-up period is then complete, so that the display surface 118 changes to the normal configuration and resumes its normal display state as in FIG. 4A, as mentioned earlier.

The motorcycle 10 having the liquid crystal display device 28 of the illustrative embodiment is configured in the above-mentioned manner, and next, operations related to the display state of the display surface 118 of the liquid crystal panel 78 in the normal configuration or in the warm-up configuration will be described with reference to FIGS. 5 and 6. Note that the following description of operations will be given by also referring to FIGS. 1 to 4B as needed.

Figure 5:
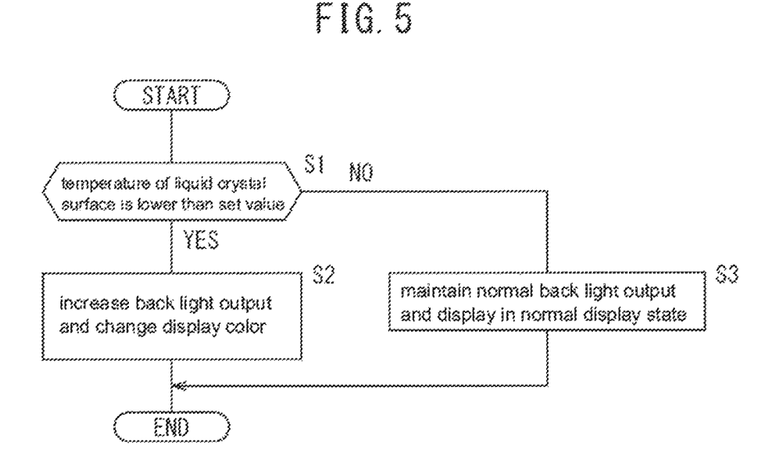
FIG. 5 is a flow chart showing operations of the liquid crystal display device of FIG. 3.
Figure 6:
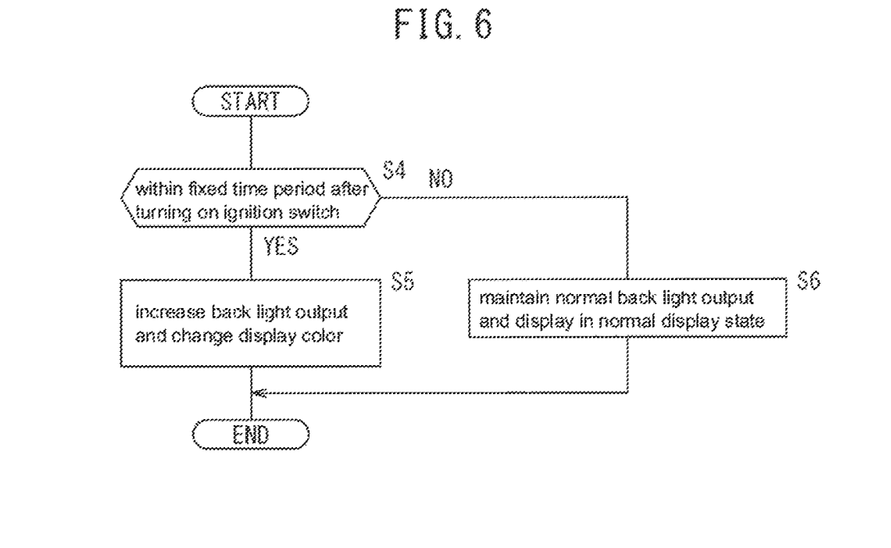
FIG. 6 is a flow chart showing other operations of the liquid crystal display device of FIG. 3.

FIGS. 5 and 6 are flow charts showing the determination processes of the display device control unit 114. The determination processes of FIGS. 5 and 6 are repeated at predetermined time intervals.

Of the processes, FIG. 5 is a process of the display device control unit 114 for determining, according to the temperature of liquid crystal detected by the liquid crystal temperature sensor 112, whether to display the normal configuration or to the warm-up configuration, i.e., whether or not to switch the display state of the display face 118 to the normal display state or the display state for cool temperatures.

FIG. 6 is a process of the display device control unit 114 for determining, according to whether or not the output increase signal is inputted from the output increase determination portion 111, whether to display the normal configuration or the warm-up configuration, i.e., whether or not to switch the display state of the display face 118 to the normal display state or the display state for cool temperatures.

In step S1 of FIG. 5, the display device control unit 114 determines whether or not the temperature of liquid crystal detected by the liquid crystal temperature sensor 112 is lower than the predetermined set value.

If the determination result is positive in step S1, the display device control unit 114 determines that there is need to increase the temperature of liquid crystal since the temperature of liquid crystal is cool. Hence, in the next step S2, the display device control unit increases output of the backlight source 116 to a larger amount than that in the normal display state to increase the light amount of backlight, and changes the display color of the background portion of the display surface 118 to a darker color having low optical transmittance, such as gray. Thus, the display surface 118 of the liquid crystal panel 78 changes to the warm-up configuration from the normal configuration.

Since the background portion of the display surface 118 is displayed in the darker color in the warm-up configuration, the amount of light penetrating the display surface 118 is reduced. This allows backlight from the backlight source 116 to be shielded by the display surface 118. Consequently, the display surface 118 is more likely to absorb backlight, whereby an increase in the temperature of the display surface 118 can be promoted, and glare from the increased amount of backlight can be eased.

Additionally, in the liquid crystal display device 28, the liquid crystal panel 78, the liquid crystal temperature sensor 112, the display device control unit 114, and the backlight source 116 are accommodated in a closed space formed by the housing 68 and the cover member 70. Hence, heat generated while the backlight source 116 outputs light is transmitted to the display surface 118. In addition, heat generated by the display device control unit 114, while it operates to adjust the electric power amount of the backlight source 116, is also transmitted to the display surface 118.

Accordingly, in the liquid crystal panel 78, an increase in the temperature of liquid crystal is promoted by heat due to absorption of backlight from the backlight source 116, as well as additional heat of the display device control unit 114. Thus, the temperature of the display surface 118 can reach the set value in a short time period.

On the other hand, if the determination result is negative in step S1, the temperature of liquid crystal is not cool, and accordingly in the next step S3, the display device control unit 114 goes to the normal configuration, and controls the liquid crystal panel 78 and the backlight source 116 to display the display surface 118 in the normal display state.

Note that the determination process of FIG. 5 is repeated at predetermined time intervals, as mentioned earlier. Hence, if, after causing the display surface to change to the warm-up configuration from the normal configuration in step S2, the determination result turns negative in the following determination processing of step S1 since the temperature of liquid crystal exceeds the set value, the display device control unit 114 may cause the display surface to change to the normal configuration from the warm-up configuration in step S3.

Meanwhile, in a case where the display device control unit 114 performs the determination process of FIG. 6 instead of that of FIG. 5, the following process is performed. The description is given of a case where the output increase determination portion 111 outputs the output increase signals to the display device control unit 114 only for a fixed time period, when the ignition switch is turned on.

In step S4 of FIG. 6, the display device control unit 114 determines whether or not the output increase signal is inputted from the output increase determination portion 111.

If the determination result is positive in step S4, the display device control unit 114 determines that there is need to increase the temperature of liquid crystal, since it is within the fixed time period after turning on the ignition switch and the temperature of liquid crystal may be cool. Hence, in the next step S5, the display device control unit increases output of the backlight source 116 to a larger amount than that in the normal display state to increase the light amount of backlight, and changes the display color of the background portion of the display surface 118 to a darker color having low optical transmittance, such as gray. Thus, the display surface 118 of the liquid crystal panel 78 changes to the warm-up configuration from the normal configuration.

Similarly, in this case, light from the backlight source 116 is shielded by the display surface 118, and this light is absorbed and converted into heat on the display surface 118 in the warm-up configuration. Additionally, heat generated in the display device control unit 114 and the backlight source 116 is also transmitted to the display surface 118. Accordingly, in the liquid crystal panel 78, heat thus generated promotes an increase in the temperature of liquid crystal. As a result, the temperature of liquid crystal can be increased in a short time period.

On the other hand, if the determination result is negative in step S4, the display device control unit 114 determines that the fixed time period has passed after turning on the ignition switch and the temperature of liquid crystal is not cool. Hence, in the next step S6, the display device control unit maintains the normal configuration, and controls the liquid crystal panel 78 and the backlight source 116 to display the display surface 118 in the normal display state.

Note that the determination process of FIG. 6 is repeated at predetermined time intervals, as mentioned earlier. Hence, if, after causing the display surface to change to the warm-up configuration from the normal configuration in step S5, the determination result turns negative in the following determination processing of step S1 since the fixed time period passes after turning on the ignition switch and input of the output increase signals stops, the display device control unit 114 may cause the display surface to change to the normal configuration from the warm-up configuration in step S6.

As has been described, according to the liquid crystal display device 28 of the embodiment, an increase in the temperature of the liquid crystal panel 78 can be promoted without requiring an additional member, by increasing output of the backlight source 116 to increase the heating power, as well as performing adjustment to reduce the amount of backlight penetrating the display contents and the background portion of the display surface 118 of the liquid crystal panel 78. Specifically, by changing the color of the display surface 118 to a less transmissive color, and thereby allowing the liquid crystal panel 78 to more easily absorb light from the backlight source 116, the liquid crystal panel 78 can easily receive heat and the temperature of liquid crystal provided inside the liquid crystal panel 78 can be increased efficiently.

Moreover, arranging the liquid crystal panel 78, the backlight source 116, and the display device control unit 114 inside the housing 68 efficiently promotes an increase in the temperature of the liquid crystal panel 78, since not only the quantity of heat generated by light from the backlight source 116, but also the quantity of heat generated when the display device control unit 114 adjusts the electric power amount of the backlight source 116, is used effectively.

Note that in the above description, in the normal display state in FIG. 4A, the display contents are displayed in colors having low optical transmittance, such as red, blue, and black, while the background portion is displayed in white. Meanwhile, in the display state for cool temperatures in FIG. 4B, the display contents and the background portion are displayed in a color having low optical transmittance, such as gray or black.

Figure 7A:
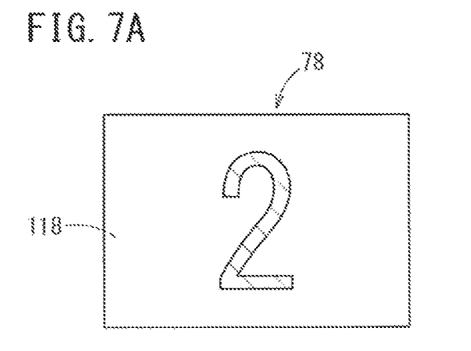
FIGS. 7A to 7C are explanatory views conceptually showing other display forms of the display surface of the liquid crystal display device.
Figure 7B:
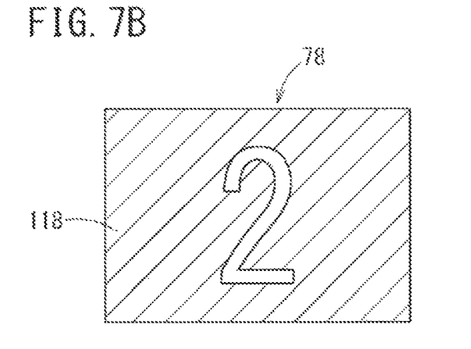

Incidentally, the display surface 118 may use a display form shown in FIGS. 7A and 7B. That is, when the temperature of liquid crystal is cool, the normal display state in FIG. 7A may be changed to the display state in FIG. 7B, for example, where the display contents are displayed in white and the background portion is displayed in a color having low optical transmittance, such as gray or black. In other words, the display state in FIG. 7B is a negative display state of the normal display state in FIG. 7A, which is displayed in inverted colors. During the warm-up configuration, display colors of the normal display state are inverted, as in a display form used at night time. With this configuration, optical transmittance of the entire display surface 118 can be lowered, so that the temperature of liquid crystal can be increased efficiently.

Figure 7C:
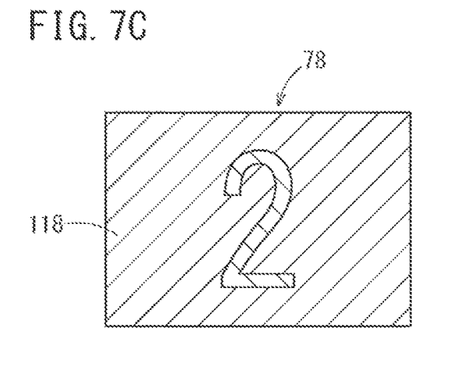

Alternatively, during the warm-up configuration, the normal display state in FIG. 4A may be changed to the display state in FIG. 7C, where only the background portion is changed to a color having low optical transmittance, such as gray or black. Otherwise, during the warm-up configuration, the normal display state in FIG. 7A may be switched to the display state in FIG. 7B, and then further be switched to the display state in FIG. 7C. These display forms also allow an efficient increase in the temperature of liquid crystal.

Note that although in the above description display colors of the display surface 118 are described by use of specific colors, such as red, blue, gray, black, and white, any color may be used as long as optical transmittance of the entire screen can be changed from high transmittance to low transmittance between the normal and warm-up configurations. In addition, lightness may be varied in the same hue to lower optical transmittance, for example, or different hues may be used for lower optical transmittance.

Additionally, although the above description has been given of a case where the output increase determination portion 111 of the ECU 84 has the timer, the timer may be provided in the display device control unit 114. That is, the timer may be provided in any of the output increase determination portion 111 and the display device control unit 114.

If the timer is provided in the display device control unit 114, the timer starts counting at a time when the ignition switch is turned on, i.e., a time when the liquid crystal display device 28 is started, and the display device control unit 114 may output notification signals indicating duration of the warm-up period to the output increase determination portion 111 until a fixed time period passes. Accordingly, the output increase determination portion 111 can send output increase signals to the display device control unit 114 while receiving the notification signals.

Alternatively, the display device control unit 114 may perform control to switch the display state of the display surface 118 to the display state of the warm-up configuration, by determining that the warm-up period continues until the fixed time period passes after the start of counting by the timer.

Moreover, the above description has been given of a case where the display device control unit 114 is provided inside the housing 68 constituting the liquid crystal display device 28. In a modified embodiment of the invention, the display device control unit 114 may be provided independently from the housing 68, or may be provided inside the ECU 84 as a component part of the ECU.

Further, the above description has been given of a case where the display device control unit 114 performs the determination process on whether to change to the normal configuration or to the warm-up period. In the embodiment, the output increase determination portion 111 of the ECU 84 may perform such a determination process. Otherwise, both of the display device control unit 114 and the output increase determination portion 111 may perform such a determination process.

Furthermore, the above description has been given of a case where the water temperature gauge 109 detects the water temperature of cooling water of the engine 32 and outputs it to the ECU 84, and then the output increase determination portion 111 outputs the output increase signal to the liquid crystal display device 28 according to the received water temperature. In the embodiment, the water temperature gauge 109 may output the detected water temperature to the liquid crystal display device 28, and instead of the temperature of the liquid crystal panel 78 detected by the liquid crystal temperature sensor 112, the display device control unit 114 may use the water temperature detected by the water temperature gauge 109 to perform the determination process on whether or not to display the normal configuration or to the warm-up configuration.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention. It is clear from the description in the scope of claims that such modified or improved modes can also be included in the technical scope of the present invention.

[Description of Reference Numerals]

| 10 | motorcycle | 28 | liquid crystal display device |
|---|---|---|---|
| 32 | engine | 68 | housing |
| 70 | cover member | 74 | opening |
| 78 | liquid crystal panel | 84 | ECU |

-continued

[Description of Reference Numerals]

| | | | |
|---|---|---|---|
| 109 | water temperature gauge | 111 | output increase determination portion |
| 112 | liquid crystal temperature sensor | 114 | display device control unit |
| 116 | backlight source | 118 | display surface |
| 120 | revolution indicator | 122 | vehicle speed indicator |
| 124 | shift position indicator | 126 | water temperature indicator |
| 128 | fuel indicator | 130 | distance indicator |
| 132 | fuel consumption indicator | | |
| 134a-134c | output response indicator | | |

What is claimed is:

1. A liquid crystal display device comprising:
   a liquid crystal panel;
   a backlight source arranged on the rear side of a display surface of the liquid crystal panel,
   a display device control unit for controlling a display state of said liquid crystal panel;
   wherein said liquid crystal panel has
      a warm-up configuration for increasing the temperature of the liquid crystal panel when a temperature of said liquid crystal panel is lower than a predetermined value, or when a time period after starting operation of said liquid crystal panel is less than or equal to predetermined time period, and
      a normal configuration for performing normal operation after completion of a warm-up period;
   and wherein said display device control unit is operable to switch between said warm-up configuration and said normal configuration, and during said warm-up configuration, said display device control unit adjusts display contents on said display surface such that an amount of light penetrating said liquid crystal panel becomes smaller than that in said normal configuration, as well as increasing output of said backlight source to a larger amount than that in said normal configuration.

2. The liquid crystal display device according to claim 1, wherein:
   said liquid crystal display device comprises a housing that accommodates said liquid crystal panel and said backlight source, the housing having an opening through which said display surface is exposed to the outside; and
   said display device control unit is arranged inside said housing, and is operable to adjust an amount of electric power supplied to said backlight source.

3. The liquid crystal display device according to claim 1, further comprising a temperature sensor operatively connected to the liquid crystal panel for sensing the temperature thereof, the temperature sensor being in electronic communication with the display device control unit.

4. The liquid crystal display device of claim 2, further comprising a temperature sensor operatively connected to the liquid crystal panel for sensing the temperature thereof, the temperature sensor disposed in the housing and being in electronic communication with the display device control unit.

5. The liquid crystal display device according to claim 1, wherein in the normal configuration of the display device control unit, display contents of the liquid crystal panel are displayed in colors having low optical transmittance selected from the group consisting of red, blue, and black, while a background portion thereof is displayed in white.

6. The liquid crystal display device according to claim 5, wherein in the warm-up configuration of the display device control unit, the display contents and the background portion of the liquid crystal panel are displayed in colors selected from the group consisting of gray and black.

7. The liquid crystal display device according to claim 1, wherein in the warm-up configuration of the display device control unit, the display contents of the liquid crystal panel are displayed in white and the background portion is displayed in a color having low optical transmittance, selected from the group consisting of gray and black.

8. A liquid crystal display device comprising:
   a hollow housing;
   a liquid crystal panel disposed in the housing;
   a backlight source arranged on the rear side of a display surface of the liquid crystal panel,
   a display device control unit for controlling a display state of said liquid crystal panel;
   wherein said liquid crystal panel has
      a warm-up configuration for increasing the temperature of the liquid crystal panel when a temperature of said liquid crystal panel is lower than a predetermined value, or when a time period after starting operation of said liquid crystal panel is less than or equal to predetermined time period, and
      a normal configuration for performing normal operation after completion of a warm-up period;
   and wherein said display device control unit is operable to switch between said warm-up configuration and said normal configuration, and during said warm-up configuration, said display device control unit adjusts display contents on said display surface such that an amount of light penetrating said liquid crystal panel becomes smaller than that in said normal configuration, as well as increasing output of said backlight source to a larger amount than that in said normal configuration.

9. The liquid crystal display device according to claim 8, wherein:
   the housing accommodates said liquid crystal panel and said backlight source, the housing having an opening through which said display surface is exposed to the outside; and
   said display device control unit is arranged inside said housing, and is operable to adjust an amount of electric power supplied to said backlight source.

10. The liquid crystal display device according to claim 8, further comprising a temperature sensor operatively connected to the liquid crystal panel for sensing the temperature thereof, the temperature sensor disposed in the housing and being in electronic communication with the display device control unit.

11. The liquid crystal display device according to claim 8, wherein in the normal configuration of the display device control unit, display contents of the liquid crystal panel are displayed in colors having low optical transmittance selected from the group consisting of red, blue, and black, while a background portion thereof is displayed in white.

12. The liquid crystal display device according to claim 11, wherein in the warm-up configuration of the display device control unit, the display contents and the background portion of the liquid crystal panel are displayed in colors selected from the group consisting of gray and black.

13. The liquid crystal display device according to claim 8, wherein in the warm-up configuration of the display device control unit, the display contents of the liquid crystal panel are displayed in white and the background portion is displayed in a color having low optical transmittance, selected from the group consisting of gray and black.

14. A motorcycle comprising:

a body frame including a head pipe;

a support bracket operatively attached to the head pipe; and a liquid crystal display device attached to the body frame by the support bracket, said liquid crystal display device comprising:

a hollow housing;

a liquid crystal panel disposed in the housing;

a backlight source arranged on the rear side of a display surface of the liquid crystal panel, a display device control unit for controlling a display state of said liquid crystal panel;

wherein said liquid crystal panel has a warm-up configuration for increasing the temperature of the liquid crystal panel when a temperature of said liquid crystal panel is lower than a predetermined value, or when a time period after starting operation of said liquid crystal panel is less than or equal to predetermined time period, and a normal configuration for performing normal operation after completion of a warm-up period;

and wherein said display device control unit is operable to switch between said warm-up configuration and said normal configuration, and during said warm-up configuration, said display device control unit adjusts display contents on said display surface such that an amount of light penetrating said liquid crystal panel becomes smaller than that in said normal configuration, as well as increasing output of said backlight source to a larger amount than that in said normal configuration.

15. The motorcyle according to claim 14, wherein:

the housing accommodates said liquid crystal panel and said backlight source, the housing having an opening through which said display surface is exposed to the outside; and the display device control unit is arranged inside the housing, and is operable to adjust an amount of electric power supplied to said backlight source.

16. The motorcyle according to claim 14, further comprising a temperature sensor operatively connected to the liquid crystal panel for sensing the temperature thereof, the temperature sensor disposed in the housing and being in electronic communication with the display device control unit.

17. The motorcycle according to claim 14, wherein in the normal configuration of the display device control unit, display contents of the liquid crystal panel are displayed in colors having low optical transmittance selected from the group consisting of red, blue, and black, while a background portion thereof is displayed in white.

18. The motorcycle according to claim 17, wherein in the warm-up configuration of the display device control unit, the display contents and the background portion of the liquid crystal panel are displayed in colors selected from the group consisting of gray and black.

19. The motorcycle according to claim 1, wherein in the warm-up configuration of the display device control unit, the display contents of the liquid crystal panel are displayed in white and the background portion is displayed in a color having low optical transmittance, selected from the group consisting of gray and black.

20. A method of operating a liquid crystal display device comprising a liquid crystal panel, a backlight source arranged on the rear side of a display surface of the liquid crystal panel, and a display device control unit for controlling a display state of said liquid crystal panel, said method comprising the steps of:

a) activating the liquid crystal display device by sending power to the device, where the device is initially in a warmup configuration in which a display density of the liquid crystal display device is darkened relative to a normal level, and an amount of power supplied to a backlight source is higher than a normal operating level;

b) activating a timer simultaneously with the liquid crystal display device activation;

monitoring an operating temperature of at least one of the liquid crystal display device and a vehicle coolant temperature; and c) changing the device to a normal configuration when a threshold event is reached, in which the display density and the amount of power supplied to the backlight source are placed at their respective normal operating levels, wherein said threshold event is either attainment of a specified operating temperature or the completion of a predetermined time as measured by the timer.

* * * * *